Feb. 26, 1963    L. F. BRUNSWICK    3,078,759
LONG-LIVED PHOTOGRAPHIC FILM WITH CONDITIONING
AND CLEANING MEANS THEREFOR
Filed June 27, 1960
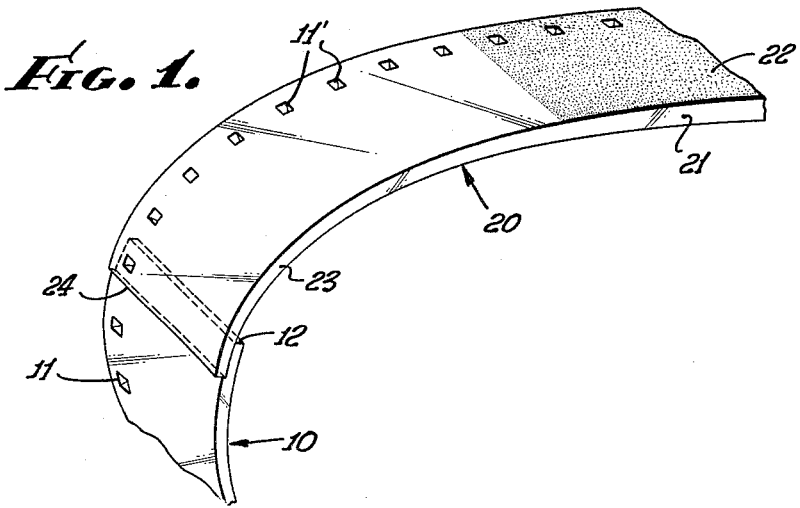
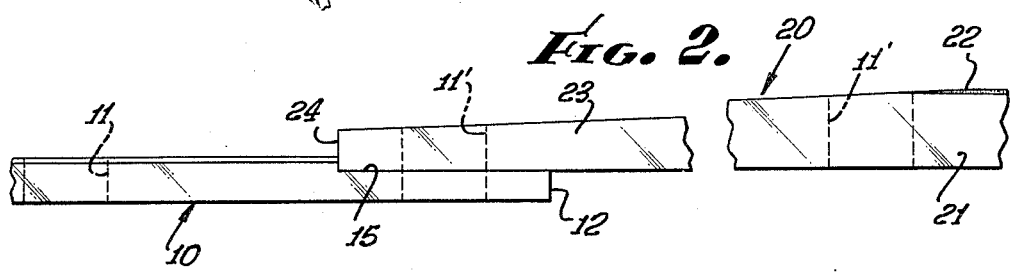
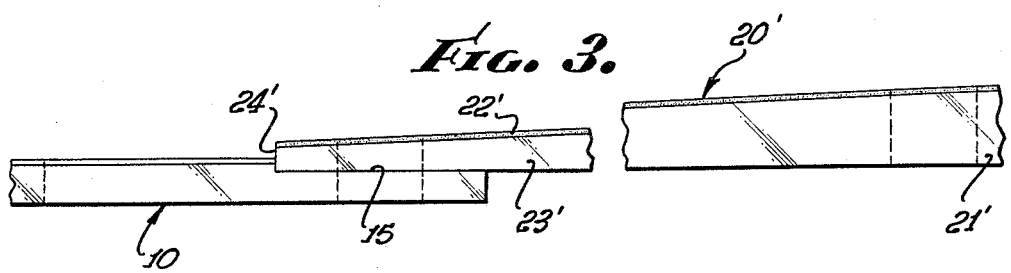
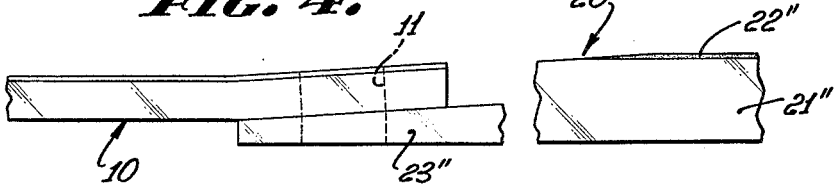
INVENTOR.
LAWRENCE F. BRUNSWICK
BY
Miketta and Glenny
ATTORNEYS.

United States Patent Office

3,078,759
Patented Feb. 26, 1963

3,078,759
LONG-LIVED PHOTOGRAPHIC FILM WITH CONDITIONING AND CLEANING MEANS THEREFOR
Lawrence F. Brunswick, 2035 Cheremoya Ave., Los Angeles, Calif.
Filed June 27, 1960, Ser. No. 39,108
2 Claims. (Cl. 88—19.5)

This invention relates to a photographic or non-sensitized film adapted for continuous or intermittent advance for projection in photographic apparatus, the film being provided with means for conditioning and cleaning the photographic apparatus whereby the life of the photographic film is enhanced and lengthened and scratching or other damage to the surface of the film during its travel through the apparatus is inhibited or prevented. The invention is also directed to an improved cleaning and conditioning film having physical characteristics which permit its ready splicing to a photographic film and the concurrent elimination of the possibility of separation at such splice.

The present invention is adapted for use with any continuous strip or tape type or cut film employed in intermittent or continuous projection, indexing, sorting or correlation of data. The term photographic film as used herein embraces tape carrying intelligence in the form of ripples or deformations which are optical correlates of electrical input signals (thermoplastic recordings), and wherever it is desired to protect and maintain the integrity of the intelligence carried by the tape or film. The benefits of the present invention can be readily understood by references to its adaptation to continuous photographic films such as motion picture films. It is to be understood that the invention may be employed with photographic films of various widths, including the standard 8-mm., 16-mm. and 35-mm. unexposed, exposed, negative and positive films, as well as much wider films employed in such fields as photo instrumentation, aerial photography, etc.

Most photographic film is provided with a base of cellulose acetate or other transparent organic plastic which acts as a carrier for the photographic emulsion of emulsion layers. In most instances such film is provided with perforations adapted to cooperatively engage with sprocket teeth and with means for causing intermittent advance of the film. Many libraries contain thousands of rolls of film which are loaned or leased for repeated projection by various gatherings, groups, etc.; other film maintained in such libraries is available for visual inspection through suitable readers. The handling and shipment of such films often causes the film to become dusty or dirty; during its progress through projectors the dust and dirt particles, as well as dislodged particles of emulsion, tend to build up on the mechanical parts of the projectors (as, for example, at the film gate) and such accumulations of dirt and emulsion often cause pronounced and extensive scratching and cutting of the emulsion carried by the film, thereby impairing the accuracy of the images carried by the film and being projected. As a result, a photographic film only has a limited life.

The present invention is directed to a photographic film which has an exceptionally long life. Generally stated, the film is provided with an attached, longitudinally extending strip of sheet material of substantially equal width to the width of the photographic film, such attached strip having an effective body portion of materially greater thickness than the photographic film, the effective body portion carrying on its face (or throughout such body) a finely divided cleaning and conditioning material. When such film and its attached leader or tail section are passed through photographic apparatus, the cleaning and conditioning strip removes accumulations of dirt and emulsion from the various mechanical portions of the photographic apparatus, burnishing and polishing such apparatus and thereby not only maintaining the photographic apparatus in better condition but simultaneously precluding the possibility of scratching or marring the photographic film. In actual practice it has been found that lending libraries have been able to double the life of motion picture films by utilization of the present invention.

A flexible strip of sheet material provided with conditioning and cleaning agents has been described in Patent No. 2,606,409. The conditioning strip is normally between two and three times as thick as a motion picture film. Some difficulty has been encountered in splicing this thicker cleaning and conditioning strip to the end of a photographic film. The cleaning and conditioning strip is not as flexible because of its thickness and because of the finely divided cleaning, burnishing and conditioning material which it carries. In many instances, the splice between the relatively thin photographic film and the thicker conditioning film will not withstand the bending to which photographic film is subjected in its passage around the various rolls and sprockets of photographic apparatus and the splice fails or breaks. Moreover, due to the rapid change in the thickness of the film assembly passing through the apparatus, there is a tendency for the claws of the intermittent movement to tear the perforations of the film.

The present invention is therefore directed toward an improved form of strip material provided with cleaning and conditioning agents whereby a more durable splice can be attained, the film may be safely handled in photographic apparatus even during high-speed, automatic rewind operations, usual types of splicers can be employed and the possibility of tearing the perforations of the film is obviated.

It is to be understood that the term "photographic apparatus" as employed herein embraces any equipment adapted to handle photographic film, such as printers, projectors, cameras, etc.

An object of the present invention, therefore, is to disclose and provide a method of producing photographic films of long effective life during which they are automatically protected from disfigurement, scratching, marring, etc.

Another object of the invention is to disclose and provide a cleaning and conditioning strip having an effective body portion materially thicker than photographic film with which it is to be employed, the cleaning and conditioning strip being provided with an end portion of progressively increasing flexbility, whereby such strip may be firmly attached to a photographic film with minimal possibilities of separation at such joint or splice.

Other objects and advantages of the invention will become apparent from the description given hereinafter. For purposes of illustration, reference will be had to the appended drawings, in which:

FIG. 1 is a perspective view of a small portion of photographic film at its zone of attachment to a strip of cleaning and conditioning film embodying the present invention.

FIG. 2 is an enlarged side elevation of one form of cleaning and conditioning strip spliced to a photographic film.

FIG. 3 is a side elevation of a modified form of cleaning and conditioning strip in spliced relation to a photographic film.

FIG. 4 is a side elevation of a further modification.

An end portion of a photographic film is indicated at 10 in FIG. 1. Such film normally consists of a transparent base made from some cellulosic derivative and carries one or more emulsion layers on its face. Edge areas of such film 10 are normally provided with perforations 11; the perforations may be adjacent one longitudinal edge, adjacent both longitudinal edges or the film may be provided with a central row of perforations. In addition, the face of the photographic film 10 may carry one or more bands of orally reproducible data, such as music, speech, signals or other intelligence, either photographically or magnetically recorded thereon.

In accordance with the present invention, the end 12 of the photographic film 10 is connected to a longitudinally extending cleaning and burnishing strip generally indicated at 20. As previously indicated, such strip may be made in accordance with the disclosures of Patent No. 2,606,409 and is provided with an effective body portion 21 carrying on its face the finely divided cleaning, burnishing and conditioning material indicated in FIG. 1 as the layer 22. In some instances the finely divided cleaning and burnishing material may be disseminated throughout the body of the base; both sides of the strip 20 may be provided with the cleaning and conditioning material. The base or matrix constituting the strip 20 may also be a cellulosic derivative capable of readily bonding with the base of the photographic film 10 by the use of appropriate solvents and the application of pressure, but in all instances the effective body portion 21 of such strip is materially thicker than the photographic film 10. For example, a normal photographic film is about 0.0045 in. thick, this including a layer of photographic emulsion which is on the order of 0.0005 in. or 0.0007 in. The cleaning, burnishing and conditioning strip 20, on the other hand, may be 0.008 in. to 0.012 in. in thickness. Although the photographic film is relatively flexible and can pass without difficulty through the various convolutions established by feed rolls, guiding rollers, pressure rollers and the like of photographic equipment, the materially thicker cleaning and burnishing strip is relatively stiff and its inherently greater rigidity prevents the normal splice between photographic film and such strip to maintain its integrity as such joint or splice passes around a sharp curve at a roller.

In accordance with the present invention, therefore, the conditioning and cleaning strip 20 is provided with an end portion 23 which is of greater flexibility than the effective body portion of such strip. In the form of invention illustrated in FIGS. 1 and 2, this end portion 23 is gradually tapered and is a progressively decreasing thickness from the effective body portion thickness at 21 to its end 24. The end 24 may be of a thickness approximating the thickness of normal photographic film or it can even be thinner than the normal photographic film 10. The strip 20 is also provided with registry pin perforations 11' or similar perforations to those carried by the photographic film so as to insure smooth progress of the completed assembly (photographic film and leader or tail strip) through the photographic apparatus.

The splice between the end 12 of the photographic film 10 and the end of the conditioning strip 20 can now be made by the use of normal, commonly employed splicing devices. The resulting splice or joint is best illustrated in FIG. 2. As there shown, a small quantity of emulsion has been removed from the photographic film 10 leaving a tongue of film base having the exposed film base surface 15. The end of strip 20 is then cemented to this tongue in the normal manner by the use of suitable solvents or adhesives. Although the total thickness of the assembly at this splice is greater than the thickness of the photographic film 10, the end portion of strip 20 immediately adjacent such splice is not materially thicker than the film 10 and is sufficiently flexible so as to eliminate the imposition of excessive strains upon the spliced joint.

The modification illustrated in FIG. 3 illustrates a conditioning and cleaning strip 20' having a maximum effective body thickness indicated at 21'. One surface of such strip 20' carries the finely divided, tenaciously adhering cleaning and burnishing material 22'. The reverse surface of strip 20' is at an angle to the face carrying the material 22' so that the end portion 23' of the strip 20' is gradually tapered and progressively more flexible as it approaches the end 24'. The joint illustrated in FIG. 3 is made substantially the same way as that previously described in connection with FIG. 2.

The further modification illustrated in FIG. 4 emphasises a simplified splice between a film and a conditioning strip of the character shown in FIG. 2. It will be noted that the film is not scraped in the region of the splice (as in FIG. 2) and the tapered end 23" of the conditioning strip is cemented to the rear side of film 10.

In actual practice the total length of the conditioning strips will vary with the type and width of film and apparatus in which it is employed, but usually such total length is effective and adequate when from about 2' to 7' in length. The end portion of increased flexibility performs effectively when it is ¾" to 2½" or 3" in length, such length of taper exceeding the length of the splice and insuring the presence of a flexible area adjacent the splice which will absorb the strains engendered in a splice as it passes over a roller of small diameter.

All changes and modifications coming within the scope of the appended claims are embraced thereby.

I claim:

1. A photographic film adapted for advance in photographic apparatus, such photographic film having a longitudinally extending strip of sheet material firmly spliced to an end of such photographic film, said longitudinal strip being substantially equal in width to the photographic film and having an effective body portion of materially greater thickness than such photographic film, said effective body portion carrying a finely divided cleaning and conditioning material, the end portion of such strip associating the body portion with the spliced end being thinner than the body portion and of tapering thickness for a length of between ¾" and 3" and of greater flexibility than the effective body portion, whereby the splice between said strip and photographic film is of lesser thickness than the combined thickness of the photographic film and body portion of the strip, and is adapted to withstand bending when said film and strip are passed through photographic apparatus.

2. A longitudinal strip of sheet material provided with perforations for cooperation with a feeding mechanism of photographic apparatus, said strip being substantially equal in width to the width of photographic film adapted to be fed through such photographic apparatus, said strip of sheet material carrying a finely divided cleaning and conditioning material on at least one face thereof and having an effective body portion of greater thickness than the photographic film, said strip being provided with an end portion which is of gradually decreasing thickness for a length of between about ¾" and 3" and of greater flexibility than the effective body portion of such strip.

References Cited in the file of this patent

UNITED STATES PATENTS

| 1,254,911 | Howell | Jan. 29, 1918 |
| 1,903,406 | Putvin | Apr. 4, 1933 |
| 2,606,409 | Gordon | Aug. 12, 1952 |

FOREIGN PATENTS

| 5,513 | Great Britain | of 1891 |

OTHER REFERENCES

Article, pages 40–41, Photographic Society of America Journal, February 1959.